Patented Dec. 10, 1940

2,224,663

UNITED STATES PATENT OFFICE 2,224,663

MIXED POLYMERS OF VINYL ACETALS

Herbert Berg and Alfons von Putzer Reybegg, Burghausen, Upper Bavaria, Germany, assignors to Chemische Forschungsgesellschaft m. b. H., Munich, Germany, a corporation of Germany No Drawing. Application December 1, 1937, Serial No. 177,650. In Germany December 4, 1936

8 Claims. (Cl. 260—32)

This invention relates to synthetic resins and to methods of producing the same. More particularly, it is concerned with the production of resins suitable for use in lacquers, moulding compositions, and the like, formed by the polymerization of monomeric or incompletely polymerized vinyl compounds in the presence of pre-polymerized vinyl compounds.

Heretofore a number of resinous materials have been prepared by the polymerization of vinyl compounds and also by the co-polymerization of a plurality of different monomeric vinyl compounds. We have now found that a new type of synthetic resins, having advantageous properties for many purposes, may be prepared by polymerizing a monomeric or only partially polymerized vinyl compounds, of the type exemplified by the esters, ethers, and halides of vinyl alcohol, in the presence of other vinyl compounds which are initially more or less completely polymerized and are therefore not subject to any extensive further polymerization. Surprisingly enough, we have found that, even though one or more of the initial materials entering the polymerization reaction does not in itself appear to be polymerized during the course of the reaction, nevertheless products are obtained which are completely homogeneous in character and which possess advantageous properties not possessed by resins of similar chemical constitution prepared by the polymerization methods used heretofore.

In producing the resins of the invention, we prefer to use as monomeric or only partially polymerized vinyl compounds the esters, halides and ethers of vinyl alcohol. Among the esters, the most important, because of its relative cheapness and commercial availability, is vinyl acetate, although other esters, such as formate, propionate and butyrate also may be used satisfactorily. Among the vinyl halides, the most important is vinyl chloride, but other halides such as vinyl fluoride and vinyl bromide may also be used. Suitable ethers are the methyl, ethyl, propyl, butyl, benzyl and cyclohexyl ethers of vinyl alcohol. In many cases it is desirable to use mixtures of the foregoing types of compounds as, for example, mixtures of vinyl chloride and vinyl acetate.

For the pre-polymerized ingredient of the mixed polymers of the present invention, we prefer to use the polyvinyl acetals. These products are produced by the reaction of polyvinyl alcohol or of partially saponified polyvinyl esters with aldehydes, such as formaldehyde, acetaldehyde, propionaldehyde, butyraldehyde, furfural crotonaldehyde, benzaldehyde and the like. The technical polyvinyl acetals of commerce usually contain a greater or lesser proportion of ester groups and/or free hydroxyl groups; accordingly, the term "polyvinyl acetal" is used herein and in the appended claims to denote not only pure polyvinyl acetals but also such acetals as contain ester and/or hydroxyl groups.

As a pre-polymerized constituent of the mixed polymer we may also utilize the partial esters of polyvinyl alcohol, obtainable by the partial saponification of polyvinyl esters, or we may use compounds of the type produced by the polymerization of vinyl compounds in the presence of drying oils.

The polymerization of the monomeric (or only partially polymerized) vinyl compounds with the pre-polymerized vinyl compounds may be carried out by any of the usual methods known to the art for affecting the polymerization reactions of this type. Thus, mixtures of the ingredients may be heated, preferably in the presence of catalysts, such as organic or inorganic peroxides, in the presence or absence of solvents. In certain cases it is advantageous to carry out the polymerization in the presence of water, wherein the ingredients may be suspended or emulsified by the addition of suitable emulsifying agents. The characteristics of the mixed polymer will, of course, vary, depending upon the particular ingredients used, the conditions of polymerization, the presence or absence of solvent, etc. By suitable selection of reactants and conditions of polymerization, products may be obtained which have a wide range of chemical and physical properties and which are thus adapted for use for the most varied purposes.

The following examples are given as illustrative of the invention without, however, restricting the invention to the specific procedures and products described therein. In the examples all parts are by weight.

Example I

A mixture of 80 parts of a technical acetaldehyde acetal of polyvinyl alcohol, 80 parts of vinyl acetate, 100 parts of methanol and one part of benzoyl peroxide was boiled under a reflux condenser until, after a period of approximately four hours, the vinyl acetate had become polymerized. The resultant product was a homogeneous, viscous solution which, upon dilution, formed an excellent lacquer. By evaporation of the solution, a solid mixed polymer was obtained which, although presumably an ester-acetal of polyvinyl alcohol, possessed characteristics very different from those of the corresponding ester-acetal of the same empirical composition, obtained in the usual manner by the partial saponification of polyvinyl acetate with simultaneous acetalization with acetaldehyde. In particular, solutions of the present product had much lower viscosities, for a given solids content, than similar solutions of the corresponding ester-acetals produced by the usual process. The product also possessed greater mechanical strength and a higher capacity for taking up fillers and pigments than the types of polyvinyl ester-acetals known heretofore.

*Example II*

A mixture of 70 parts of a technical acetaldehyde acetal of polyvinyl alcohol, 70 parts of linseed stand oil, 630 parts of vinyl acetate and 4 parts of 30% hydrogen peroxide solution was boiled for five hours under a reflux condenser. Besides of unchanged vinyl acetate the resultant product was a mixed polymer containing 31.9% acetal constituents, 36.2% acetate constituents, and 31.9% oil constituents. This product is especially useful for the production of lacquers.

*Example III*

To 100 parts of technical polyvinyl alcohol acetaldehyde acetal, in the form of a 30% solution in benzol, was added 0.02 part of tin tetrachloride, in the form of 1% solution in benzol, and 20 parts of vinyl ethyl ether. The solution was maintained at a temperature of 20–30° C. with vigorous stirring or agitation. After a period of about 20 to 30 minutes, polymerization began and, after one hour, a gelatinous mass was formed which, upon standing exposed to the air for a period of one to two days, became fluid again and yielded a clear solution. By heating the liquefaction of the gel may be accelerated.

The resultant product, either with or without the addition of pigments, is suitable for the production of lacquers of outstanding merit. The films produced from such lacquers are distinguished particularly by their high mechanical strength and elasticity and by their extraordinary resistance to water and moisture. Thus, films produced from this resin are more than 50 times as resistant to water as films formed from the polyvinyl acetal utilized as a starting material. The latter type of films, when moistened with water, became soft and cloudy after only 2 to 3 minutes exposure, whereas films produced from the product just described showed no signs of spotting or weakening after being in contact with water for a period of three hours.

*Example IV*

A mixture of 6 parts of a technical polyvinyl alcohol acetaldehyde acetal, one and a half parts of linseed stand oil and one part of vinyl ethyl ether, dissolved in benzol, was polymerized by the addition of a tin tetrachloride solution in the same manner as described in Example III above. In this case also, a solid jelly was initially formed which subsequently became liquid. Lacquers produced therefrom exhibited a considerably higher resistance to water than those produced from the polyvinal acetal utilized as a starting material.

The resins produced in accordance with the invention may be modified in accordance with the usual practice of the resin and lacquer arts, for example, by the addition of other natural and synthetic resins, drying oils, waxes, solvents, diluents, plasticizers, fillers, dyestuffs, pigments or the like, to effect any desired modification of the physical and chemical properties of the resin.

It is to be understood that the invention is not restricted to the specific procedures, reagents, quantities, etc., specifically described hereinabove, but includes all such variations, modifications and equivalents as fall within the scope of the appended claims.

We claim:

1. A process which comprises polymerizing in a non-aqueous medium a mixture composed of a vinyl compound selected from the group consisting of the esters, ethers, and halides of vinyl alcohol, and a polyvinyl acetal in solution.

2. A process which comprises polymerizing in a non-aqueous medium a mixture composed of a vinyl ester and a polyvinyl acetal in solution.

3. A process which comprises polymerizing in a non-aqueous medium a mixture composed of a vinyl halide and a polyvinyl acetal in solution.

4. A process which comprises polymerizing in a non-aqueous medium a mixture composed of a vinyl ether and a polyvinyl acetal in solution.

5. A homogeneous mixed polymerization product of a polyvinyl acetal and a vinyl compound selected from the group consisting of the esters, ethers, and halides of vinyl alcohol, said product being prepared by the process set forth in claim 1.

6. A homogeneous mixed polymerization product of a polyvinyl acetal and a vinyl ester, said product being prepared by the process set forth in claim 2.

7. A homogeneous mixed polymerization product of a vinyl halide and a polyvinyl acetal, said product being prepared by the process set forth in claim 3.

8. A homogeneous mixed polymerization product of a vinyl ether and a polyvinyl acetal, said product being prepared by the process set forth in claim 4.

HERBERT BERG.
ALFONS v. PUTZER REYBEGG.